Dec. 8, 1925.
C. H. CLARE
1,564,941
MEANS OF MOUNTING WHEELS OR PULLEYS ON AXLES OR SHAFTS
Filed Sept. 18, 1924
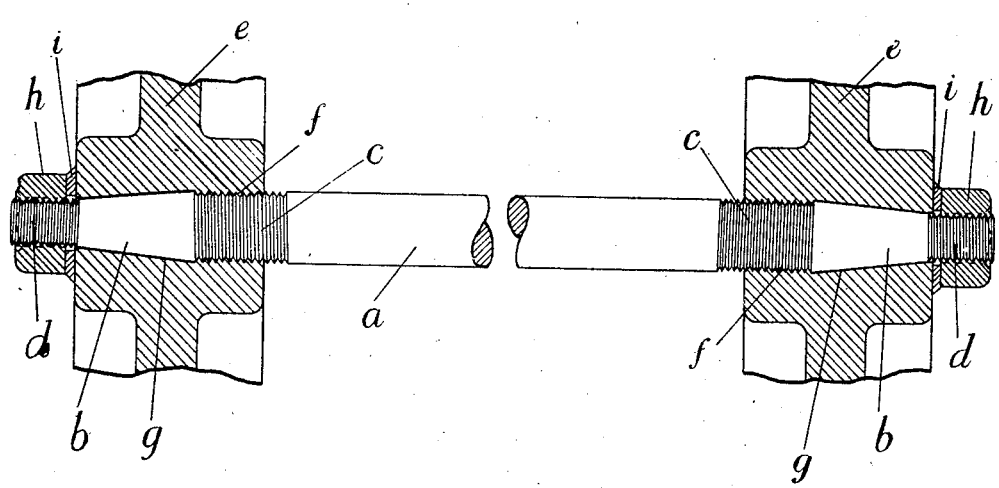
Inventor
CHARLES HENRY CLARE,
By Toulmin & Toulmin,
ATTORNEYS Patented Dec. 8, 1925.

1,564,941

UNITED STATES PATENT OFFICE.

CHARLES HENRY CLARE, OF SALFORD, ENGLAND.

MEANS OF MOUNTING WHEELS OR PULLEYS ON AXLES OR SHAFTS.

Application filed September 18, 1924. Serial No. 738,510.

*To all whom it may concern:*

Be it known that I, CHARLES HENRY CLARE, a subject of the King of Great Britain, residing at 20 Kent Street, Lower Broughton, Salford, in the county of Lancaster, England, have invented certain new and useful Improvements in Means of Mounting Wheels or Pulleys on Axles or Shafts, of which the following is a specification, reference being had therein to the accompanying drawing.

This invention relates to means of mounting wheels or pulleys on axles or shafts.

In the usual method of such mountings, more particularly in wheels for motor vehicles, the axle is formed with a coned or tapered portion near each end in which a keyway is provided and a screw threaded portion at each extreme end, the hub of the wheel being correspondingly coned or tapered interiorly to fit the coned portion of the axle and also provided with a keyway for the reception of a key for keying the wheel non-rotatably on the axle. A nut is screwed on to the threaded end of the axle to keep the wheel in position.

In another construction, a plurality of grooves are formed in the shaft into which corresponding projections interiorly of the hub are adapted to engage.

In both these constructions, however, owing to the excessive strains to which the wheel and shaft are subjected in operation, great wear takes place between the key and keyway or between the grooves and projections, especially where the nut is not sufficiently tight or become loose as not to keep the coned or tapered portions of the wheel hub and axle in close relation to one another.

The object of this invention is to provide improved means whereby play between a wheel or pulley and an axle or shaft is eliminated.

According to this invention, an axle or shaft is characterized by a coned or tapered portion intermediate of two oppositely directed screw threaded portions of different diameters whereby a wheel or pulley or the like correspondingly screw threaded and tapered can be rotated into position over one screw thread in one direction and a securing nut rotated into position over the other screw thread in the opposite direction.

The drawing filed herewith is a part sectional elevation of one form of axle or shaft and complementary wheel or pulley mounted on each end thereof in accordance with this invention.

$a$ is an axle or shaft, $b$ a coned or tapered portion near each end thereof and intermediate of two oppositely directed screw threaded portions of different diameters $c$ and $d$. The inner screw threaded portion $c$ being of larger diameter than the outer screw threaded end $d$. The hub or boss of the wheel or pulley $e$ or the like is correspondingly screw threaded interiorly at $f$ for a portion of its length to engage the thread $c$ and tapered for the remainder of its length at $g$ to seat on to the tapered portion $b$ of the axle or shaft. A securing nut $h$ is adapted to be secured on to the oppositely directed threaded portion $d$, a washer $i$ being disposed between said nut and the wheel or pulley.

It will therefore be seen that the securing nut $h$ screws into position in the opposite direction to that in which the wheel or pulley screws into position and, when once the wheel or pulley and likewise the nut has been screwed tightly home, any resistance to the wheel and shaft when in rotation, only serves to tighten both the wheel and the nut.

When applied to the axle of a motor vehicle where a wheel is mounted at each end of an axle, as shown, the two screw threaded portions at one end are preferably each directed in opposite relation to its equivalent screw threaded portion at the other end so that in use, when the axle and wheels are rotating together, the frictional resistance of the road will act on each wheel in the same direction, for example, assuming the axle and wheels in the example shown to be travelling in the forward direction looking at the rear of a vehicle, the wheels, immediately the vehicle starts, will tend to rotate backwards and consequently screw themselves tighter on the threads $c$ and thereby correspondingly tighten themselves on their tapered seats and if the nuts $h$ are screwed up to the wheels when said wheels have tightened themselves to their full limit, there cannot be any play when the axle is rotated in the reverse direction and even if there was, the nuts $h$ would then tighten themselves against the wheels.

What I claim and desire to secure by Letters Patent is:—

In a wheel and axle mounting, an axle, a tapered portion on said axle, oppositely directed screw threaded portions of different diameters on each side of said tapered portion, a wheel hub having a screw threaded engagement with said screw threaded portion of larger diameter, a tapered portion on the hub engaging the tapered portion of the axle, and a nut engaging the screw threaded portion of less diameter.

In testimony whereof I affix my signature.

CHARLES HENRY CLARE.